P. Cary.
Horse Power.
No. 90,423. Patented May 25, 1869.
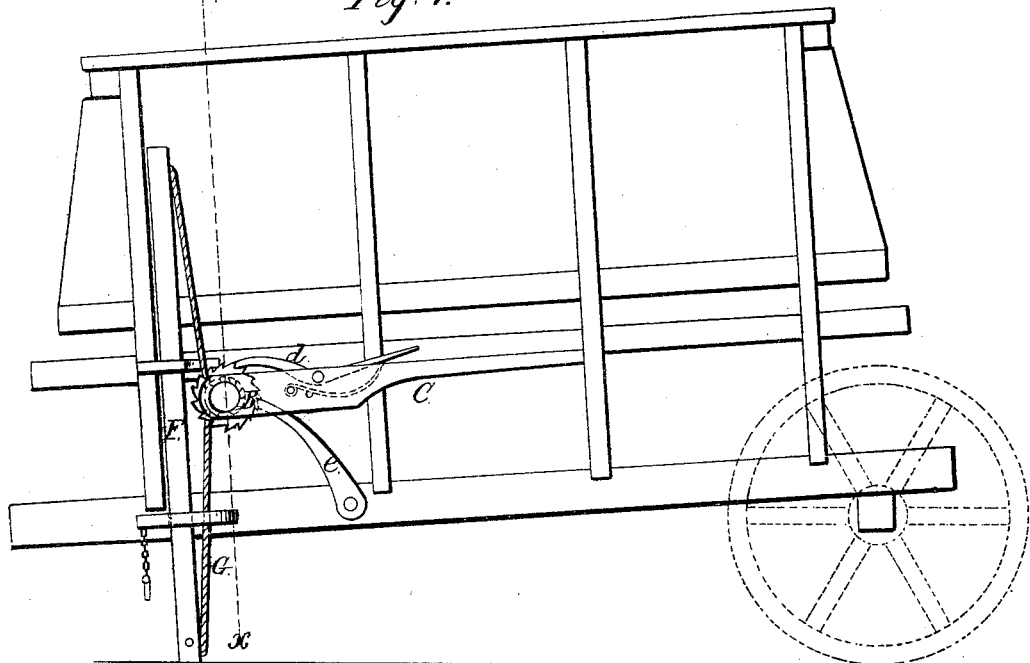
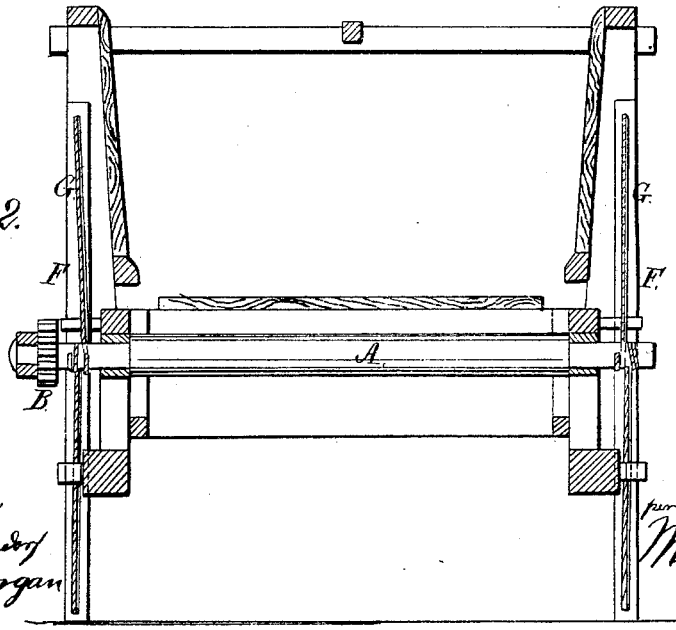
Witnesses:
A. Bennemendy
Wm A Morgan
Inventor:
P. Cary
per Munn & Co
Attys

United States Patent Office.

PETER CARY, OF COEYMANS, NEW YORK.

Letters Patent No. 90,423, dated May 25, 1869.

---

HOISTING-ATTACHMENT FOR PORTABLE HORSE-POWER.

---

The Schedule referred to in these Letters Patent and making part of the same.

---

*To all whom it may concern:*

Be it known that I, PETER CARY, of Coeymans, in the county of Albany, and State of New York, have invented a new and useful Improvement in Hoisting-Attachment to Portable Horse-Powers; and I do hereby declare that the following is a full, clear, and exact description thereof, which will enable those skilled in the art to make and use the same, reference being had to the accompanying drawing, forming part of this specification.

This invention relates to a new and useful improvement in method of loading and unloading portable horse-powers used in threshing grain, and for other purposes; and It consists in attaching to the rear end of the ordinary endless-chain horse-power, a transverse shaft, with ratchet and pawls, with ropes or chains connected therewith, for hoisting, in the manner hereinafter described.

The drawing represents a side elevation of such a power, with my hoisting-apparatus attached.

Figure 2 is a vertical section through the line *x x*.

Similar letters of reference indicate corresponding parts.

A represents a horizontal shaft, attached to the frame of the horse-power, which is made to revolve beneath the floor of the revolving apron.

The ends of this shaft project through the frame, as seen in the drawing, on one end of which there is a ratchet-wheel, B.

C is the lever, by which the ratchet is operated, or the shaft revolved.

This lever is loosely connected with the end of the shaft, in any manner, so that it plays up and down freely.

Attached to the lever there is a pawl, *d*, which engages with the teeth of the ratchet when the lever is raised, thereby revolving the shaft.

*e* is another pawl, for holding, or preventing the shaft from turning back.

F F represent sliding bars, which are secured to the frame, so that they may move freely up and down.

These bars are connected with the shaft by ropes or chains, G G, which are secured to the shaft, so that their ends extend each way, and are attached to the ends of the bars, as seen in the drawing.

Now, in revolving the shaft in one direction, it will be seen that the bars will be brought down so that they rest on the ground as seen in the drawing.

By continuing the movement of the shaft in the same direction, the rear end of the horse-power may be raised to any desired height, while what is gained by each stroke of the lever will be held by the pawl *e*.

By revolving the shaft in an opposite direction, the end of the power is lowered.

In using these portable horse-powers, one pair of wheels is taken off, and the end of the power lowered, in order to give it the proper inclination.

The strength of several men is required to raise the power for replacing the wheels, as these powers are usually handled.

By this attachment, one man is all that is required for loading or unloading it, effecting thereby a very important saving in time and labor.

A pin, passing through the bars F, or any other suitable method, may be adopted for holding up the bars, when they are not in use.

I claim as new, and desire to secure by Letters Patent—

In combination with a horse-power, the hoisting-attachment herein shown and described; that is to say, the shaft A, with ratchet B, bars F, and ropes G, with the pawls and lever connected therewith, arranged and operating for the purpose set forth.

The above specification of my invention signed by me, this 29th day of October, 1868.

PETER CARY.

Witnesses:
FRANK BLOCKLEY,
ALEX. F. ROBERTS.